United States Patent
Boike et al.

(10) Patent No.: US 7,360,117 B1
(45) Date of Patent: Apr. 15, 2008

(54) IN-CIRCUIT EMULATION DEBUGGER AND METHOD OF OPERATION THEREOF

(75) Inventors: Mark A. Boike, Plano, TX (US); Alan Phan, Rowlett, TX (US); Brendon J. Slade, San Jose, CA (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 499 days.

(21) Appl. No.: 10/279,344

(22) Filed: Oct. 24, 2002

(51) Int. Cl.
*G06F 11/00* (2006.01)

(52) U.S. Cl. .............................. 714/34; 714/28; 703/28

(58) Field of Classification Search .................. 714/30, 714/34, 28, 724; 703/28; 712/227
See application file for complete search history.

(56) References Cited

U.S. PATENT DOCUMENTS

| | | | |
|---|---|---|---|
| 4,218,739 A * | 8/1980 | Negi et al. ................... | 710/262 |
| 5,132,971 A * | 7/1992 | Oguma et al. ................ | 714/28 |
| 5,463,760 A * | 10/1995 | Hamauchi .................... | 703/28 |
| 5,630,102 A * | 5/1997 | Johnson et al. ............... | 703/28 |
| 5,640,542 A * | 6/1997 | Whitsel et al. ............... | 703/28 |
| 5,737,516 A * | 4/1998 | Circello et al. ............... | 714/38 |
| 5,983,017 A | 11/1999 | Kemp et al. | |
| 6,158,023 A * | 12/2000 | Ubukata et al. .............. | 714/35 |
| 6,385,742 B1 | 5/2002 | Kirsch et al. | |
| 6,598,178 B1* | 7/2003 | Yee et al. ..................... | 714/34 |
| 6,751,751 B1* | 6/2004 | Murray et al. ................ | 714/34 |
| 2004/0019831 A1* | 1/2004 | Gergen et al. ................ | 714/34 |

OTHER PUBLICATIONS

"Embedded RISC Microcontroller Core" ARM7TDMI; by AMI Semiconductor; 2 pages; Nov. 1999.

* cited by examiner

*Primary Examiner*—Robert Beausoliel
*Assistant Examiner*—Philip Guyton

(57) ABSTRACT

An in-circuit emulation debugger and method of operating an in-circuit emulation debugger to test a digital signal processor (DSP). In one embodiment, the in-circuit emulation debugger includes: (1) a device emulation unit, coupled to a collocated DSP core, for emulating circuitry that is to interact with the DSP core, (2) an external processor interface, coupled to the device emulation unit, that receives control signals from an external processor that cause the device emulation unit to provide a test environment for the DSP core and (3) a breakpoint detection circuit, associated with the device emulation unit, that responds to preprogrammed breakpoints based on occurrences of events both internal and external to the DSP core.

18 Claims, 3 Drawing Sheets

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| INST. ADDR | INST. ADDR | INST. ADDR | INST. ADDR. | DATA ADDR. | DATA VALUE | EXT. | EXT. | EXT. | EXT. | RES | RES | RES | RES | CORE STOP | COMB. LOGIC |

IN-CIRCUIT EMULATION DEBUGGER AND METHOD OF OPERATION THEREOF

TECHNICAL FIELD OF THE INVENTION

The present invention is directed, in general, to test apparatus for processors and, more specifically, to an in-circuit emulation debugger for testing digital signal processors (DSPs) and a method of operating the same to test such DSPs.

BACKGROUND OF THE INVENTION

Complex electronic circuits have found many applications in today's world. All too often, the design of these complex electronic circuits is a long and complicated process. As the complexity of the design of electronic circuits continues to increase, the difficulty in locating and correcting problems associated with the construction and operation of the electronic circuits will, almost certainly, also continue to increase.

One apparatus that has been developed to assist in determining the cause of problems in a complex electronic circuit is called an "in-circuit emulation debugger." An in-circuit emulation debugger allows a user to operate a complex electronic circuit, such as a digital signal processor (DSP), within an emulated operating environment and examine the state of the circuit during its operation at any given point in time. An in-circuit emulation debugger does not simply stop or suspend the circuit, because data may be in transit on busses between components when the circuit's state is desired to be examined. Instead, an in-circuit emulation debugger gently stops the circuit, so that the data in transit can be captured.

A "breakpoint" is a time at which the state of the circuit is to be determined. In-circuit emulation debuggers may stop a circuit through a breakpoint that has been previously defined. Breakpoints may be established, for example, based on a address instruction, data storage or software memory access commands. Unlike some other debugging tools, conventional in-circuit emulation debuggers do not require a user to alter a software program or memory to indicate when a breakpoint has been reached. Instead, in-circuit emulation debuggers may use hardware to actually stop a core processor without altering software programs within the core processor. Though an excellent tool for determining and solving problems associated with constructing DSPs, traditional in-circuit emulation debuggers do not provide enough breakpoint features for advance debugging and monitoring.

Accordingly, what is needed in the art is an improved in-circuit emulator debugger and a method that provides more flexibility and monitoring for debugging complex electronic circuits such as a digital signal processor.

SUMMARY OF THE INVENTION

To address the above-discussed deficiencies of the prior art, the present invention provides an in-circuit emulation debugger and method of operating an in-circuit emulation debugger to test a digital signal processor. In one embodiment, the in-circuit emulation debugger includes: (1) a device emulation unit, coupled to a collocated DSP core, for emulating circuitry that is to interact with the DSP core, (2) an external processor interface, coupled to the device emulation unit, that receives control signals from an external processor that cause the device emulation unit to provide a test environment for the DSP core and (3) a breakpoint detection circuit, associated with the device emulation unit, that responds to preprogrammed breakpoints based on occurrences of events both internal and external to the DSP core. For purposes of the present invention, a "collocated DSP core" is a DSP core that is located on the same integrated circuit (IC) substrate.

The present invention therefore introduces a more powerful in-circuit emulation debugger that, in various embodiments, monitors either or both of internal and external events as a basis for supporting preprogrammed breakpoints that can be used advantageously in debugging a DSP core. Accordingly, in one embodiment of the present invention, the preprogrammed breakpoints depend only upon a selected one of: (1) the events internal to the DSP core and (2) the events external to the DSP core. In an alternative embodiment, one of the preprogrammed breakpoints depends upon both an event internal to the DSP core and an event external to the DSP core (and is therefore a so-called "combinatorial logic" event).

In one embodiment of the present invention, the events internal to the DSP core are selected from the group consisting of: (1) execution of a particular breakpoint instruction, (2) attainment by a particular variable of a particular value and (3) containment of a particular value at a particular address. The events external to the DSP core may originate in any external device or circuit and can be, for example real-time events.

In one embodiment of the present invention, the in-circuit emulation debugger further includes a status register, associated with the device emulation unit, that contains data associated with the preprogrammed breakpoints. In an embodiment to be illustrated and described, the status register contains locations for a plurality of flags corresponding to various internal, external and combinatorial logic events.

In one embodiment of the present invention, the device emulation unit stores indications of the occurrences of the events. In the embodiment to be illustrated and described, the indications are stored as flags in a status register. However, those skilled in the pertinent art will understand that occurrences of the events may drive interrupts or cause devices, circuitry or tests to be reconfigured as a particular application may find advantageous.

In one embodiment of the present invention, the device emulation unit emulates a real-time data communications environment. Such environment may be encountered in Voice-over-Network (VoN) gateways, routers, switches, remote-access concentrators and wireless terminals and base stations. Those skilled in the pertinent art will understand, however, that the broad scope of the present invention is not limited to these particular real-time environments or real-time environments, in general.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 2 illustrates a block diagram of a status register constructed according to the principles of the present invention.

DETAILED DESCRIPTION

Figure 1:
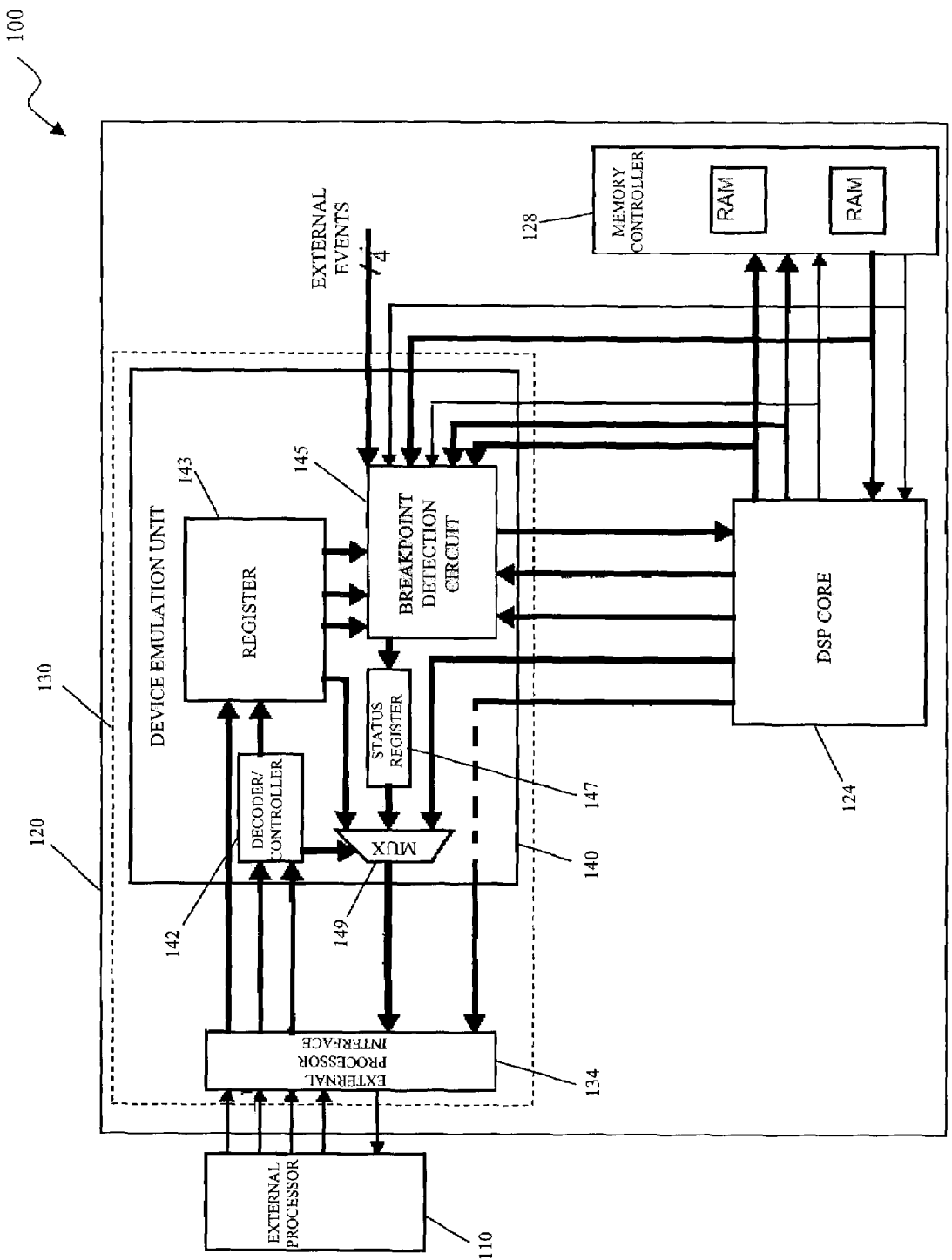
FIG. 1 illustrates a block diagram of a digital signal processor (DSP) system employing an in-circuit emulation debugger constructed according to the principles of the present invention.

Referring initially to FIG. 1, illustrated is a block diagram of a digital signal processor (DSP) system, generally designated 100, employing an in-circuit emulation debugger 130, constructed according to the principles of the present invention. The DSP system 100 includes an external processor 110 and a DSP 120. The DSP 120 includes a DSP core 124, a memory controller 128 and the in-circuit emulation debugger 130. The in-circuit emulation debugger 130 includes an external processor interface 134 and a device emulation unit 140. The device emulation unit 140 includes a decoder/controller 142, a register 143, a breakpoint detection circuit 145, a status register 147 and a multiplexer 149.

The external processor 110 may be a conventional processor of a personal computer coupled to the DSP 120. The external processor 110 may provide an interface for a user to direct and monitor the in-circuit emulation debugger 130 while debugging the DSP core 124. The external processor 110 may direct the in-circuit emulation debugger 130 by sending control signals to the device emulation unit 140 through the external processor interface 134. The control signals sent to the device emulation unit 140 may include instructions and data that cause the device emulation unit 140 to provide a test environment for the DSP core 124. Additionally, the external processor 110 may be coupled to a conventional computer having a monitor that may be employed to provide visibility to a status of preprogrammed breakpoints used by the in-circuit emulation debugger 130.

The DSP 120 may be a conventional DSP used throughout the industry. Additionally, the DSP core 124 and the memory controller 128 may be standard components of a conventional DSP. As illustrated, each component of the DSP 120 may coupled together through a series of conventional busses. In some embodiments, the DSP core 124 may be a ARM™ processor by ARM Limited of Cambridge, England or a MIPS™ processor by MIPS Technologies, Inc. of Mountain View, Calif. In a preferred embodiment, the DSP core 124 is collocated with the device emulation unit 140. As illustrated in FIG. 1, the memory controller 128 may include random access memory (RAM). One skilled in the art will understand the operation and configuration of a conventional DSP having a standard DSP core and a standard memory controller.

The in-circuit emulation debugger 130 provides advance debugging features that may ease the development of application software, operating systems, and hardware. The in-circuit emulation debugger 130 may monitor either or both of internal and external events as a basis for supporting preprogrammed breakpoints that can be used advantageously in debugging the DSP core 124. The in-circuit emulation debugger 130 may stop the DSP core 124 in an exact cycle through a preprogrammed breakpoint that may depend only upon a selected one of events internal to the DSP core 124 and events external to the DSP core 124. In a preferred embodiment, the in-circuit emulation debugger 130 is collocated with the DSP core 124. In other embodiments, the in-circuit emulation debugger 130 may be located separate from the DSP core 124.

The external processor interface 134, which may be coupled to the device emulation unit 140, receives control signals from the external processor 110 that cause the device emulation unit 140 to provide a test environment for the DSP core 124. The external processor interface 134 may be a passive interface that allows the external processor 110 to send control signals to the device emulation unit 140. In a preferred embodiment, the external processor interface 134 may be a conventional JTAG controller as defined by The Institute of Electronic and Electrical Engineers (IEEE) Standard 1149.1, which is incorporated herein by reference. Commonly referred to as the JTAG standard based on the development by the Joint Test Action Group, the IEEE 1149.1 boundary-scan standard provides an interface for testing that has been adopted throughout the industry.

In the preferred embodiment, the external processor interface 134 may receive control signals from the external processor 110 via a JTAG serial port. The external processor interface 134 may store the control signals in a JTAG register before sending the control signals to the device emulation unit 140 via parallel busses. The external processor interface 134 may send data from the control signals to the register 143 via one parallel bus and send instructions from the control signals to the register 143 via other parallel busses and the decoder/controller 142.

The device emulation unit 140 may also send debugging data to the external processor 110 via the external processor interface 134. The debugging data may represent the state of the DSP system 100 at the occurrence of an event that a preprogrammed breakpoint is based-on. The debugging data may include data associated with the preprogrammed breakpoints and the status of the DSP core 124. Typically the debugging data may indicate the occurrences of the events that the preprogrammed breakpoints are based-on and the status of the DSP core 124 when the events occurred. The external processor interface 134 may serially shift the debugging data to the external processor 110 after storing the debugging data in registers common to a JTAG controller.

The device emulation unit 140 coupled to the collocated DSP core 124, emulates circuitry that is to interact with the DSP core 124. In a preferred embodiment, the device emulation unit 140 emulates a real-time data communications environment within which the DSP core 124 is to operate. The device emulation unit 140 may emulate the real-time data communications environment by decoding instructions and employing the data of the control signals received from the external processor 110. The device emulation unit 140 may allow a user to set preprogrammed breakpoints, read and write memory data to the memory controller 128, manipulate the state of the DSP core 124 and monitor the debugging data. In some embodiments, the device emulation unit 140 may store indications of the occurrences of the events that the preprogrammed breakpoints are based upon. In a preferred embodiment, the status register 147 may store the occurrences of such events as flags.

The decoder/controller 142 may be a dedicated circuit configured to decode instructions received from the control signals of the external processor 110. The decoder/controller 142 may receive the instructions via a parallel bus of the external processor interface 134. The decoder/controller 142 may send the decoded instructions to the register 143.

The register 143 may be a conventional register that receives the decoded instructions and data from the control signals from the external processor 110. The register 143 may be a single register or a combination of registers. For example, the register 143 may include a 24 bit instruction address register that stores breakpoint addresses. Additionally, the register 143 may include a counter register for each instruction address breakpoint. In some embodiments, the register 143 may include a register designated to store debugging instructions that may be requested by the external processor 110.

The breakpoint detection circuit 145 associated with the device emulation unit 140, responds to the preprogrammed breakpoints based on occurrences of events both internal and external to the DSP core 124. One of the preprogrammed breakpoints may depend upon both an event internal to the DSP core 124 and an event external to the DSP core 124. The events internal to the DSP core 124 may include execution of a particular breakpoint instruction, attainment by a particular variable of a particular value, or containment of a particular value at a particular address.

In FIG. 1, the breakpoint detection circuit 145 is configured to receive up to four external events. In other embodiments, the breakpoint detection circuit 145 may receive more than or less than four external events. In some embodiments, the events external to the DSP core 124 may be real-time events. In one embodiment, the events external to the DSP core 124 may originate in at least one external device. The external device, for example, may be another DSP.

The breakpoint detection circuit 145 may also detect a breakpoint based on a combinatorial logic event which may be a combination of event occurrences. The capability of employing combinatorial logic events provides increased flexibility for advance debugging. The combination of events may include solely internal events, solely external events or a combination of internal and external events. The breakpoint detection circuit 145 may employ conventional combinational or sequential logic gates to determine a combinatorial logic event.

The status register 147, associated with the device emulation unit 140, may be a conventional register that contains data associated with the preprogrammed breakpoints. The status register 147 may assist in providing accurate diagnostic and debugging of the DSP core 124 by permitting the use of multiple preprogrammed breakpoints and the ability to identify a particular preprogrammed breakpoint when an associated event occurs. In one embodiment, the status register 147 may not record an occurrence of an event associated with a preprogrammed breakpoint once an event associated with another preprogrammed breakpoint has been recorded. Once the contents of the status register 147 are sent to the external processor 110 via the external processor interface 134 and the multiplexer 149, the status register 147 may be cleared and ready to store the occurrence of another event. The status register allows a user to monitor numerous events and combinations of events. More information regarding a status register will be discussed below with reference to FIG. 2.

The multiplexer 149 may be a conventional multiplexer. The multiplexer 149 may receive the debugging data from the register 143, the status register 147 and the DSP core 124. In addition, the multiplexer 149 may receive control information from the decoder/controller 142 and emulation data from the register 143. The control information may be decoded instructions from the external processor 110. The multiplexer 149 may send the debugging data or the emulation data to the external processor 110 via the external processor interface 134 based on the control information.

Turning now to FIG. 2, illustrated is a block diagram of a status register, generally designated 200, constructed according to the principles of the present invention. The status register 200 may provide a preprogrammed breakpoint to an external processor at the occurrence of an associated event even when multiple preprogrammed breakpoints are employed. The status register 200, therefore, allows multiple preprogrammed breakpoints for advanced diagnostic and debugging of a DSP. In a preferred embodiment, the status register 200 may be a write-after-read register. Typically, the status register 200 is coupled to an external processor and a breakpoint detection circuit. The status register 200 may be coupled to the external processor via a multiplexer and an external processor interface.

The status register 200 includes 16 bits numbered from 0 to 15. The 16 bits of the status register 200 include flags corresponding to various internal, external and combinatorial logic events. The flags may be a designated bit, for example 1, that may or may not indicate if an occurrence of an event has occurred. Of course, one skilled in the pertinent art will understand that the size of a status register may vary depending on the number of preprogrammed breakpoints that are supported by an associated device emulation unit. Additionally, one skilled in the pertinent art will also understand that the type of preprogrammed breakpoints employed may vary.

In the status register 200, bit 15 represents a combinatorial logic event and Bit 14 represents a DSP core stop command. The combinatorial logic event may be based on a combination of internal or external events. Bits 10-13 are reserved for events that may be determined for a specific DSP application.

Bits 6-9 represent external events that may be received to stop a DSP core. The external events may be from a single external device, from separate external devices or a combination of external devices. Indication of an occurrence of at least one of the external events may be received via bus ports of the breakpoint detection circuit.

Bits 0-5 include flags for internal events. As one skilled in the pertinent art will understand, the internal events represented in bits 0-5 may be referred to as attainment by a particular variable of a particular value (bit 5), containment of a particular value at a particular address (bit 4) and execution of particular breakpoint instructions (bits 0-3). More specifically, bit 5 represents a data value breakpoint instruction event, bit 4 represents a data address breakpoint instruction event and bits 0-3 represent address breakpoint instruction events. The events represented by bits 0-5 may be associated with a register of a device emulation unit such as the register 143 discussed above with respect to FIG. 1.

Figure 3:
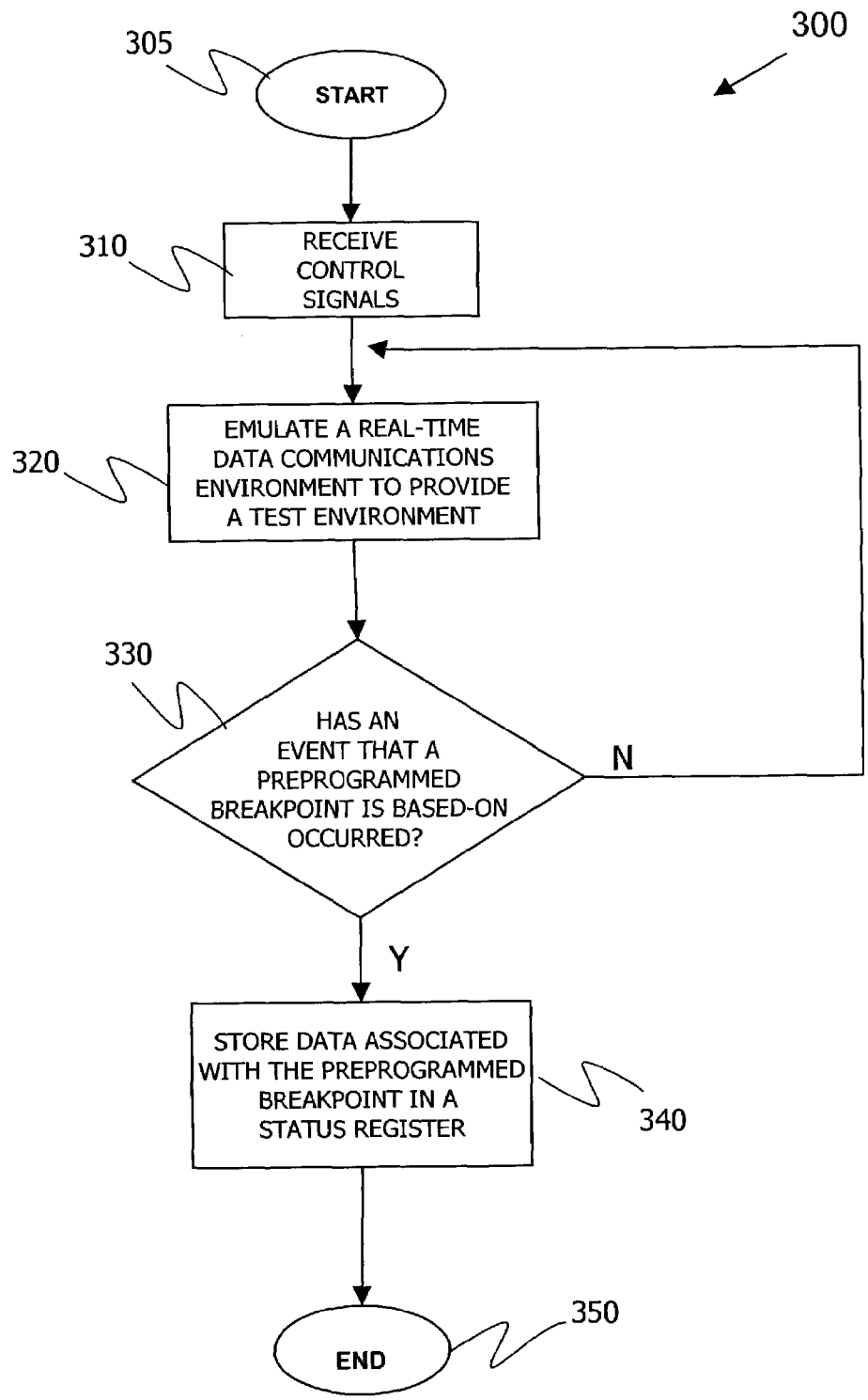
FIG. 3 illustrates a flow diagram of a method of operating an in-circuit emulation debugger according to the principles of the present invention.

Turning now to FIG. 3, illustrated is a flow diagram of a method, generally designated 300, of operating an in-circuit emulation debugger, according to the principles of the present invention. The method starts in a step 305 with an intent to operate the in-circuit emulation debugger.

After starting, a device emulation unit receives control signals from an external processor in a step 310. The control signals may be received via an external processor interface. In a preferred embodiment, the external processor interface may be a JTAG controller. The control signals may include instructions and data to cause the device emulation unit to provide a test environment for a collocated DSP core coupled to the device emulation unit. The device emulation unit may include, among other components, a status register and a breakpoint detection circuit.

After receiving the control signals, the device emulation unit emulates a real-time data communications environment to provide a test environment for the DSP core in a step 320. The device emulation unit may employ the control signals to emulate and provide a test environment. The device emulation unit may contain a register or registers having instructions, data, controls and addresses that the control signals manipulate to emulate the real-time data communications environment and provide a test environment. The real-time data communications environment emulated may be encountered in Voice-over-Network (VoN) gateways, routers, switches, remote-access concentrators and wireless terminals and base stations. Of course, those skilled in the pertinent art will understand, that the device emulation unit may emulate other environments besides a real-time data communications environment to provide a test environment for the DSP core.

After emulating and providing the test environment, a determination is made if an event that a preprogrammed breakpoint is based-on has occurred in a decisional step 330. In a preferred embodiment, a breakpoint detection circuit may determine if an event has occurred. The preprogrammed breakpoint may depend only upon a selected one of internal events to the DSP core and external events external to the DSP core. In one embodiment the preprogrammed breakpoints may depend upon combinatorial logic events. In some embodiments, the combinatorial logic events may include both an event internal to the DSP core and an event external to the DSP core. The events internal to the DSP core may include execution of a particular breakpoint instruction, attainment by a particular variable of a particular value, and containment of a particular value at a particular address. One skilled in the pertinent art will understand the operation of these internal events and understand that the preprogrammed breakpoints may be based on additional internal events.

After determining that an event has occurred, data associated with the preprogrammed breakpoint is stored in a status register in a step 340. In a preferred embodiment the device emulation unit stores the associated data in the status register. The associated data may be indications of occurrences of the events that the preprogrammed breakpoints are based-on. In one embodiment, the indications may be flags in the status register. Typically, the stored data may be sent to the external processor for analysis.

After storing the associated data, operating an in-circuit emulation debugger ends in a step 350. One skilled in the pertinent art will understand, however, that multiple preprogrammed breakpoints may exist and that the presence of the status register may advantageously provide continued operation of the in-circuit emulation debugger. For example, a user may poll the status register, determine the preprogrammed breakpoint associated with a flag and then continue operating the in-circuit emulation debugger. Alternatively, the user may end operation of the in-circuit emulation debugger after polling the status register. Returning now to the decisional step 330, if the device emulation unit determines that an event has not occurred, then the method proceeds to step 320 and continues as before.

Although the present invention has been described in detail, those skilled in the art should understand that they can make various changes, substitutions and alterations herein without departing from the spirit and scope of the invention in its broadest form.

What is claimed is:

1. An in-circuit emulation debugger, comprising:
   a device emulation unit, coupled to a collocated DSP core, for emulating circuitry that is to interact with said DSP core;
   an external processor interface, coupled to said device emulation unit, that receives control signals from an external processor that cause said device emulation unit to provide a test environment for said DSP core;
   a breakpoint detection circuit, associated with said device emulation unit, that determines occurrences of events both internal and external to said DSP core that preprogrammed breakpoints are based on and responds to said preprogrammed breakpoints; and
   a status register, associated with said device emulation unit, that contains data received from said breakpoint detection circuit, said data indicating at least whether an occurrence, associated with said preprogrammed breakpoint, has occurred.

2. The in-circuit emulation debugger as recited in claim 1 wherein said preprogrammed breakpoints depend only upon a selected one of:
   said events internal to said DSP core, and
   said events external to said DSP core.

3. The in-circuit emulation debugger as recited in claim 1 wherein one of said preprogrammed breakpoints depends upon both an event internal to said DSP core and an event external to said DSP core.

4. The in-circuit emulation debugger as recited in claim 1 wherein said events internal to said DSP core are selected from the group consisting of:
   execution of a particular breakpoint instruction,
   attainment by a particular variable of a particular value, and
   containment of a particular value at a particular address.

5. The in-circuit emulation debugger as recited in claim 1 wherein said device emulation unit stores indications of said occurrences of said events.

6. The in-circuit emulation debugger as recited in claim 1 wherein said device emulation unit emulates a real-time data communications environment.

7. A method of operating an in-circuit emulation debugger, comprising:
   receiving control signals from an external processor into a device emulation unit via an external processor interface, said device emulation unit coupled to a collocated DSP core for emulating circuitry that is to interact therewith and said control signals causing said device emulation unit to provide a test environment for said collocated DSP core;
   determining occurrences of events both internal and external to said DSP core that preprogrammed breakpoints are based on;
   responding to said preprogrammed breakpoints; and
   storing data received from said breakpoint detection circuit in a status register associated with said device emulation unit, said data indicating at least whether an occurrence, associated with said preprogrammed breakpoint, has occurred.

8. The method as recited in claim 7 wherein said preprogrammed breakpoints depend only upon a selected one of:
said events internal to said DSP core, and
said events external to said DSP core.

9. The method as recited in claim 7 wherein one of said preprogrammed breakpoints depends upon both an event internal to said DSP core and an event external to said DSP core.

10. The method as recited in claim 7 wherein said events internal to said DSP core are selected from the group consisting of:
execution of a particular breakpoint instruction,
attainment by a particular variable of a particular value, and
containment of a particular value at a particular address.

11. The method as recited in claim 7 further comprising storing indications of said occurrences of said events.

12. The method as recited in claim 7 further comprising emulating a real-time data communications environment.

13. An in-circuit emulation debugger, comprising:
a device emulation unit, coupled to a collocated DSP core, for emulating a real-time data communications environment within which said DSP core is to operate;
an external processor interface, coupled to said device emulation unit, that receives control signals from an external processor that cause said device emulation unit to provide a test environment for said DSP core;
a breakpoint detection circuit, associated with said device emulation unit, that determines occurrences of events both internal and external to said DSP core that preprogrammed breakpoints are based on and responds to said preprogrammed breakpoints; and
a status register, associated with said device emulation unit, that contains data received from said breakpoint detection circuit, said data indicating at least whether an occurrence, associated with said preprogrammed breakpoint, has occurred.

14. The in-circuit emulation debugger as recited in claim 13 wherein said preprogrammed breakpoints depend only upon a selected one of:
said events internal to said DSP core, and
said events external to said DSP core.

15. The in-circuit emulation debugger as recited in claim 13 wherein one of said preprogrammed breakpoints depends upon both an event internal to said DSP core and an event external to said DSP core.

16. The in-circuit emulation debugger as recited in claim 13 wherein said events internal to said DSP core are selected from the group consisting of:
execution of a particular breakpoint instruction,
attainment by a particular variable of a particular value, and
containment of a particular value at a particular address.

17. The in-circuit emulation debugger as recited in claim 13 wherein said events external to said DSP originate in at least one external device.

18. The in-circuit emulation debugger as recited in claim 13 wherein said events external to said DSP are real-time events.

* * * * *